(12) United States Patent
Chiu et al.

(10) Patent No.: US 6,869,231 B2
(45) Date of Patent: Mar. 22, 2005

(54) TRANSMITTERS, RECEIVERS, AND TRANSCEIVERS INCLUDING AN OPTICAL BENCH

(75) Inventors: Liew Chuang Chiu, Singapore (SG); Ron Pang Cheng Chuan, Singapore (SG); Ronson K. Tan, Singapore (SG); Eric Yoke-Thee Tan, Singapore (SG)

(73) Assignee: JDS Uniphase Corporation, San Jose, CA (US)

( * ) Notice: Subject to any disclaimer, the term of this patent is extended or adjusted under 35 U.S.C. 154(b) by 321 days.

(21) Appl. No.: 10/172,403

(22) Filed: Jun. 14, 2002

(65) Prior Publication Data

US 2003/0206703 A1 Nov. 6, 2003

Related U.S. Application Data

(60) Provisional application No. 60/377,345, filed on May 1, 2002.

(51) Int. Cl.[7] ................................................. G02B 6/36
(52) U.S. Cl. .......................................... 385/93; 385/88
(58) Field of Search ............................. 385/14, 33, 31, 385/88–89, 92–94, 136–137, 139, 76–78

(56) References Cited

U.S. PATENT DOCUMENTS

| | | | |
|---|---|---|---|
| 3,717,823 A | 2/1973 | Abdale et al. | |
| 4,119,363 A | 10/1978 | Camlibel et al. | |
| 4,237,474 A | 12/1980 | Ladany | |
| 4,327,963 A | 5/1982 | Khoe et al. | |
| 4,338,577 A | 7/1982 | Sato et al. | |
| 4,584,688 A | 4/1986 | Demeure et al. | |
| 4,736,231 A | 4/1988 | Ayabe et al. | |
| 4,752,109 A | 6/1988 | Gordon et al. | |
| 4,762,395 A | 8/1988 | Gordon et al. | |
| 4,802,178 A | 1/1989 | Ury | |
| 4,802,727 A | 2/1989 | Stanley | |
| 4,803,689 A | 2/1989 | Shibanuma | |
| 4,818,053 A | 4/1989 | Gordon et al. | |
| 4,854,659 A | 8/1989 | Hamerslag et al. | |
| 4,875,750 A | 10/1989 | Spaeth et al. | |
| 4,926,430 A | 5/1990 | Isono | |
| 4,930,857 A | 6/1990 | Acarlar | |
| 4,962,990 A | 10/1990 | Matsuzawa et al. | |
| 4,983,009 A | 1/1991 | Musk | |
| 5,023,447 A | 6/1991 | Masuko et al. | |
| 5,068,865 A | 11/1991 | Ohshima et al. | |
| 5,267,252 A | 11/1993 | Amano | |
| 5,408,559 A | 4/1995 | Takahashi et al. | |
| 5,854,867 A | * 12/1998 | Lee et al. | ..................... 385/49 |

* cited by examiner

Primary Examiner—Karl D. Frech
Assistant Examiner—Lisa M. Caputo
(74) Attorney, Agent, or Firm—Allen, Dyer, Doppelt, Milbrath & Gilchrist, P.A.

(57) ABSTRACT

An optical transmitter includes an optical bench in one embodiment. A window frame is mounted to a mounting block having a groove to form the optical bench. Optic and electro-optic components of the optical transmitter are mounted to the optical bench. The window frame includes a plurality of openings for mounting one or more ball lenses, an optical isolator, and a semiconductor laser. The semiconductor laser chip is used to generate light signals for optical communication over an optical fiber. The one or more ball lenses may be mounted into ball lens openings of the window frame and extend into the groove of the mounting block. One of the ball lenses maybe used to focus light signals between an optical fiber and the optical transmitter. Another one of the ball lenses may be used to collimate the light output from the semiconductor laser. In another embodiment, an optical receiver includes the optical bench. In yet another embodiment, an optical transceiver includes the optical bench.

42 Claims, 7 Drawing Sheets

TRANSMITTERS, RECEIVERS, AND TRANSCEIVERS INCLUDING AN OPTICAL BENCH

CROSS REFERENCE TO RELATED APPLICATIONS

This U.S. Non-Provisional Patent Application claims the benefit of U.S. Provisional Patent Application No. 60/377,345 entitled "TRANSMITTERS, RECEIVERS, AND TRANSCEIVERS INCLUDING AN OPTICAL BENCH", filed May 1, 2002 by Liew Chuang Chiu et al.

FIELD OF THE INVENTION

The invention relates generally to the field of optical data links and optical transmitters, receivers, and transceivers. Particularly, the invention relates to an optical bench and techniques for packaging optical transmitters, receivers, and transceivers.

BACKGROUND OF THE INVENTION

Optical transmitters that utilize semiconductor lasers have become more important in recent years. One particularly significant application of these types of transmitters is in communication systems where fiber optic communication media is employed. With the growth in electronic communication, communication speed has become more important in order to increase data bandwidth in electronic communication systems. Improved transmitters can play a vital roll in increasing data bandwidth in communication systems using fiber optic communication media such as local area networks (LANs), metropolitan area networks (MANs) and wide area networks (WANs)(e.g. the Internet). A preferred component for optical interconnection of electronic components and systems via optical fibers is a transmitter that utilizes a semiconductor laser.

For example, with reference to FIG. 1, a very basic example of a communication system 100 is shown. In the communication system 100, a first printed circuit board PCB-X 102 of a first host system 103 is optically or communicatively connected to a second PCB-Y 110 of a second host system 111. Particularly, a transmitter-X 104 of PCB-X 102 is connected through fiber optic cable 122 to a receiver-Y 112 of PCB-Y 110 and a transmitter-Y 114 of PCB-Y 110 is connected through fiber optic cable 120 to a receiver-X 106 of PCB-X 102. Accordingly, transmitter-X 104 of PCB-X 102 can transmit photons or light signals (e.g. data) through fiber optic cable 122, which is then received by receiver-Y 112 of PCB-Y 110 where it can be processed by the second host system 111. On the other hand, transmitter-Y 114 of PCB-Y 110 can transmit photons or light signals (e.g. data) through fiber optic cable 120, which is then received by receiver-X 106 of PCB-X 102 where it can be processed by the first host system 103. Thus, a communication system 100 utilizing photons or light signals to communicate data through fiber optic cables between a first and second host system is formed.

One of the major obstacles to the practical implementation of optical communication systems is in the difficulty of achieving sufficiently accurate alignment in and of the various system and subsystem components of the optical communication system, and in maintaining that alignment for extended period of times. This is particularly true for the internal components of optical transmitters (e.g. a semiconductor laser, associated lenses, and other required components), which need to have accurate and sustained alignment for their entire operational life.

Moreover, another obstacle to the practical implementation of optical communication systems is that they must often operate in dirty and/or harsh environments—e.g. where particulates such as dust and liquids (e.g. water) are present. This is particularly true for the components of a transmitter where the continued cleanliness of the components, such as the lenses for the focusing of the light signals, is critical for the continued reliable operation of the transmitter. Further, it is desirable that a transmitter be hermetically sealed to prevent liquids and particulates (e.g. dust) from entering the transmitter and interfering with the operation of the internal components of the transmitter.

BRIEF DESCRIPTION OF THE DRAWINGS

The features of the embodiments of the invention will become apparent from the following detailed description in which.

Like reference numbers and designations in the drawings indicate like elements providing similar functionality.

DETAILED DESCRIPTION OF THE INVENTION

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

Generally, embodiments of the invention relate to optical transmitters, receivers, and transceivers including an optical bench. Optical transmitters may also be referred to as light transmitters, fiber optic transmitters, and fiber optic modules for transmitting an optical signal. Optical receivers may also be referred to as light receivers, fiber optic receivers, and fiber optic modules for receiving an optical signal. Optical transceivers may also be referred to as light transceivers, fiber optic transceivers, and fiber optic modules for transceiving optical signals. Collectively they may all generally be referred to as optical communicators, electro-optic and opto-electric transducers, a fiber optic module, or optical data link.

In one embodiment, a window frame is coupled to a mounting block to form an optical bench. The window frame has one or more openings and the mounting block includes a slot or groove to mount optical and opto-electronic devices or components of the optical transmitter, receiver, or transceiver. One or more openings in the window frame which align or coincide with the groove in the mounting block are for aligning and mounting one or more optical components, such as a ball lens. One or more openings in the window frame which align with a surface of the mounting block are for aligning and mounting one or more opto-electronic devices, such as a semiconductor laser.

In the optical transmitter mounted with optical bench, a focusing ball lens is mounted into a focusing ball lens opening, an optical isolator is mounted into an isolator opening, a collimating ball lens is mounted into a collimating ball lens opening, a semiconductor laser chip is mounted into a laser chip opening, and a monitoring photodiode/submount is mounted into a submount opening in the window frame. The focusing ball lens, the optical isolator, and the collimating ball lens extend through the respective openings in the window frame into the slot or groove in the mounting block. The focusing ball lens focuses light into the optical fiber. The collimating ball lens collimates the radiated light beam from the semiconductor laser into the focusing ball lens through the optical isolator. The semiconductor laser is used to generate light signals for optical communication.

Further embodiments of the invention relate to packaging to enclose the opto-electronic devices, the optical devices and the optical bench.

Figure 1:
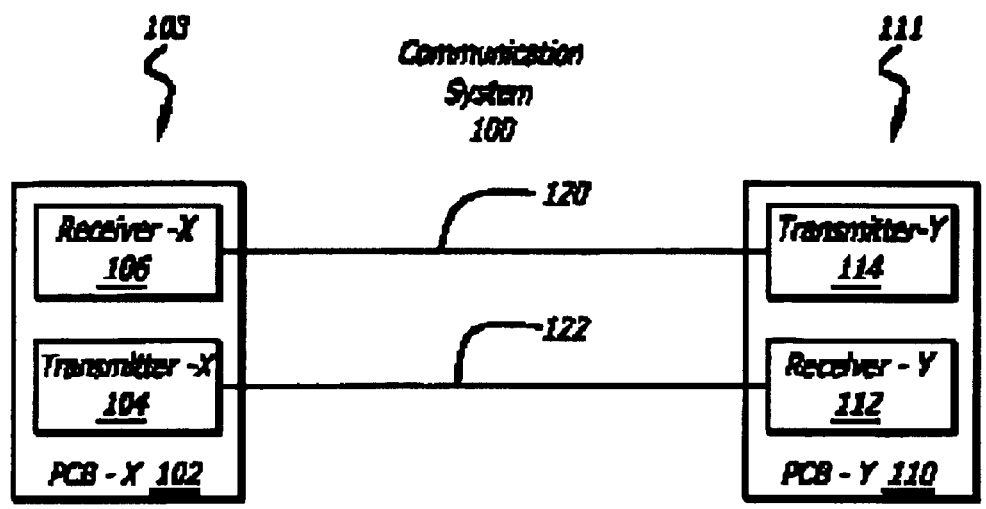
FIG. 1 is a block diagram illustrating an example of a communication system.
Figure 2:
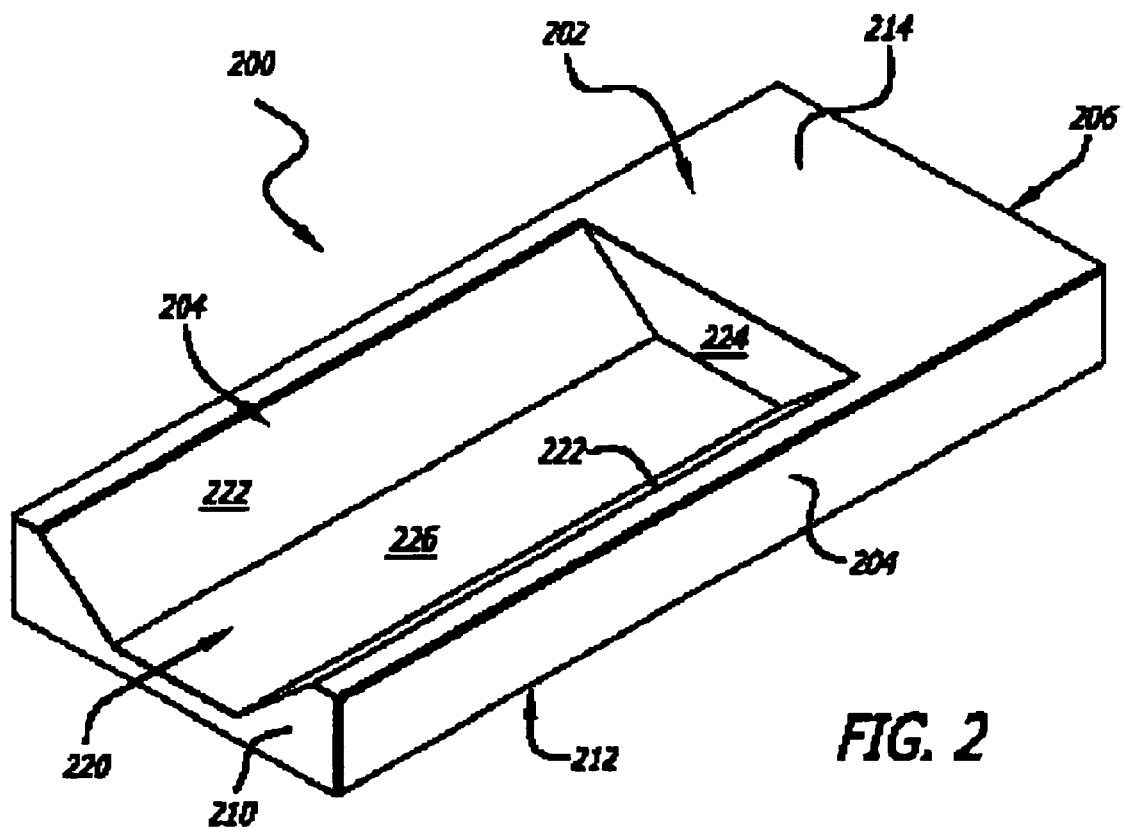
FIG. 2 is a perspective view of a mounting block according to one embodiment of the invention.

Referring now to FIG. 2, a perspective view of a mounting block 200 according to one embodiment of the invention is illustrated. As shown in FIG. 2, the mounting block 200 is generally rectangularly shaped. The mounting block 200 includes a top portion 202, a pair of parallel sidewalls 204, a backwall 206, a front wall 210, and a base 212. The top portion 202 includes a flat planar portion 214 extending from the backwall 206 and a slot or groove 220 formed in the mounting block 200. The slot or groove 220 extends from the flat planar portion 214 to the front wall 210. In one embodiment, the slot or groove 220 is V-shaped. In another embodiment, the slot or groove 220 is U-shaped. Accordingly, the front wall 210 also includes an opening to match the shape of the slot or groove 220, such as a V-shaped or U-shaped opening, which is part of the slot or groove 220 as is shown in FIG. 2.

The slot or groove 220 has two angled sidewalls 222 that slope inwardly down towards a flat planar base 226, and a backwall 224 that extends straight down to the base 226 from the flat planar portion 214. The slot or groove 220 of the mounting block 200 may preferably be made by machining the slot or groove 220 directly into a block of material. Gross machining tolerance is adequate to manufacture the mounting block 200 (e.g. +/−100 um). In one embodiment, the mounting block 200 can be machined out of an aluminum block and then fully plated with gold. However, it should be appreciated, that other materials could just as easily be used. As will be discussed, the mounting block 200 is used as a support for a window frame and the components mounted therein.

Figure 3:
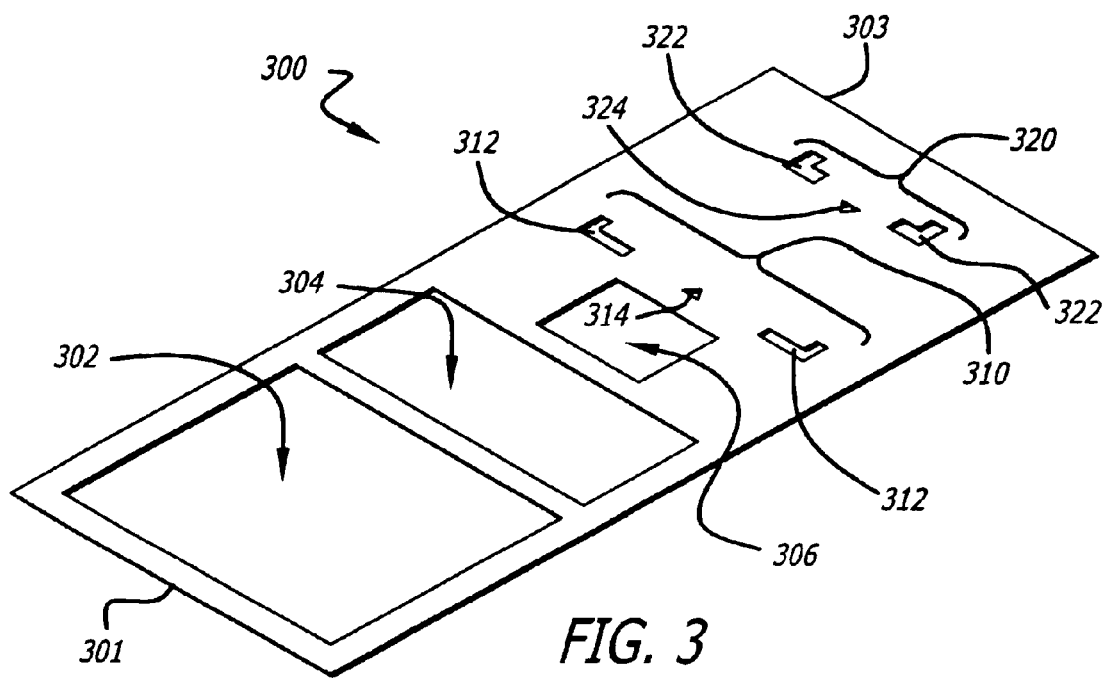
FIG. 3 is a perspective view of a window frame according to one embodiment of the invention.

Referring now to FIG. 3, a perspective view of a window frame 300 according to one embodiment of the invention is illustrated. The window frame 300 is generally rectangularly shaped and is relatively thin. The window frame 300 has a front end 301 and a back end 303. Moreover, the window frame 300 has one or more openings which are precisely cut or etched to properly align optical components and electro-optic components along an optical axis. Particularly, adjacent the front end 301 of the window frame 300, the window frame includes a first opening 302 that is generally rectangular or square in shape to mount an optical component such as a first ball lens. The first opening may be referred to as a focusing ball lens opening with the first ball lens being a focusing ball lens. Adjacent the first opening 302 is a second opening 304 that is generally rectangular or square in shape to mount another optical component such as an optical isolator. The second opening 304 may also be referred to as an isolator opening.

Next, a third opening 306 is located adjacent the second opening 304, which is generally square or rectangular in shape to mount another optical component such as a second ball lens. The third opening 306 may be referred to as a collimating lens opening with the second ball lens being a collimating lens.

The first opening 302, the second opening 304, and the third opening 306 for mounting the optical components, align or coincide with the slot or groove 220 in the mounting block. That is, the openings that align or coincide with the slot or groove allow the optical components mounted therein to extend down towards the bottom 226 of the slot or groove 220.

The window frame 300 further includes openings to align and mount one or more optoelectronic devices such as a semiconductor laser and/or a semiconductor photo diode to the optical axis. One or more openings 310 to align and mount an optoelectronic device such as a semiconductor laser are located adjacent the third opening 306. The one or more openings 310 may directly mount an opto-electronic device such as a semiconductor laser chip, die, or integrated circuit (IC) or indirectly by mounting a submount of the opto-electronic device. If a submount is mounted, the opto-electronic device is mounted to the submount. In the case of an optical transmitter, the one or more openings 310 may also be referred to as laser chip openings. Particularly, the one or more openings 310 provide three mounting points including a pair of opposed L-shaped openings 312 and a triangular shaped opening 314 therebetween. In one embodiment, the triangular shaped opening 314 is in line with the optical axis of the optical transmitter. A substrate or base of the optoelectronic device or submount may include a pair of L-shaped protrusions and a triangular protrusion to precisely align and mount the optoelectronic device or the submount to the optical bench and the optical axis.

Adjacent the back end 303 of the window frame 300 are one or more openings 320 to mount another optoelectronic device such as a monitoring photodiode. The monitoring photodiode may directly mount to the one or more openings 320 or indirectly be means of a submount. If a submount is mounted, the optoelectronic device is mounted to the submount. In the case of an optical transmitter, the one or more openings 320 to mount a monitoring photodiode or its submount may also be referred to as monitoring photodiode openings. Particularly, the one or more openings 320 include a pair of opposed L-shaped openings 322 and a triangular shaped opening 324 therebetween. A substrate or base of an optoelectronic device or its submount may include a pair of L-shaped protrusions and a triangular protrusion to precisely align and mount the optoelectronic device to the optical bench and the optical axis. The remaining portion of the substrate or base rests on the solid portions of the window frame 300.

The one or more openings in the window frame 300 to mount the one or more optoelectronic devices and/or submounts align or coincide with the flat planar portion 214 of the mounting block 200 so that they may be supported thereon. That is, the openings that align or coincide with the flat planar portion 214 of the mounting block allow a part of the optoelectronic components mounted therein to extend approximately the thickness of the window frame 300 towards the flat planar portion 214.

The window frame 300 is formed of a solid material such as metal. Preferably the window frame 300 is formed of stainless-steel. Stainless-steel is a preferable material in order to achieve the best accuracy in a chemical etching process of the one or more openings (e.g. +/−5 um). Furthermore, preferably the thickness of the window frame 300 is approximately 0.1 mm. Moreover, the window frame 300 when formed of stainless-steel is preferably fully plated with gold.

Figure 4:
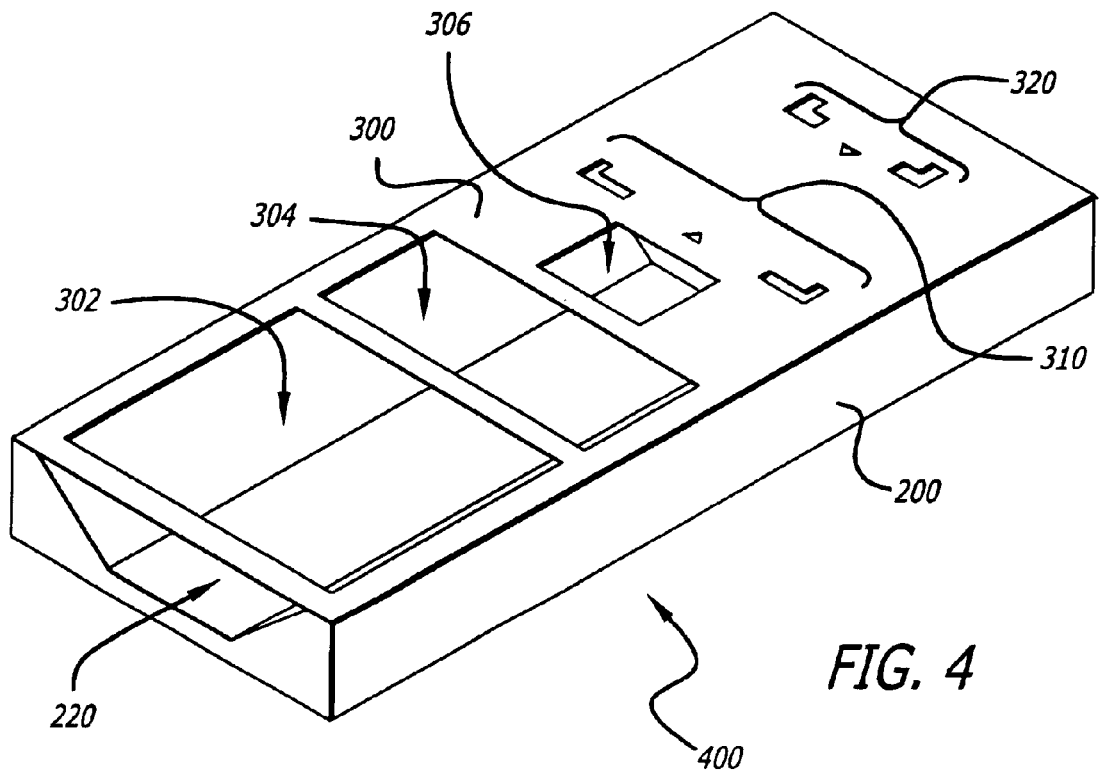
FIG. 4 is a perspective view of the window frame coupled to the mounting block to form an optical bench according to one embodiment of the invention.

Referring now to FIG. 4, a perspective view of the window frame 300 is coupled to the mounting block 200 to form the optical bench 400 according to one embodiment of the invention. In the preferred embodiment, the window frame 300 is stacked onto the mounting block 200 and secured thereto by utilizing a solder paste. However, it should be appreciated that other methods of coupling the window frame 300 to the mounting block 200 may be used. As will be discussed, components of a transmitter can be easily mounted to the optical bench 400 to form a light or optical transmitter mounted with an optical bench.

Figure 5:
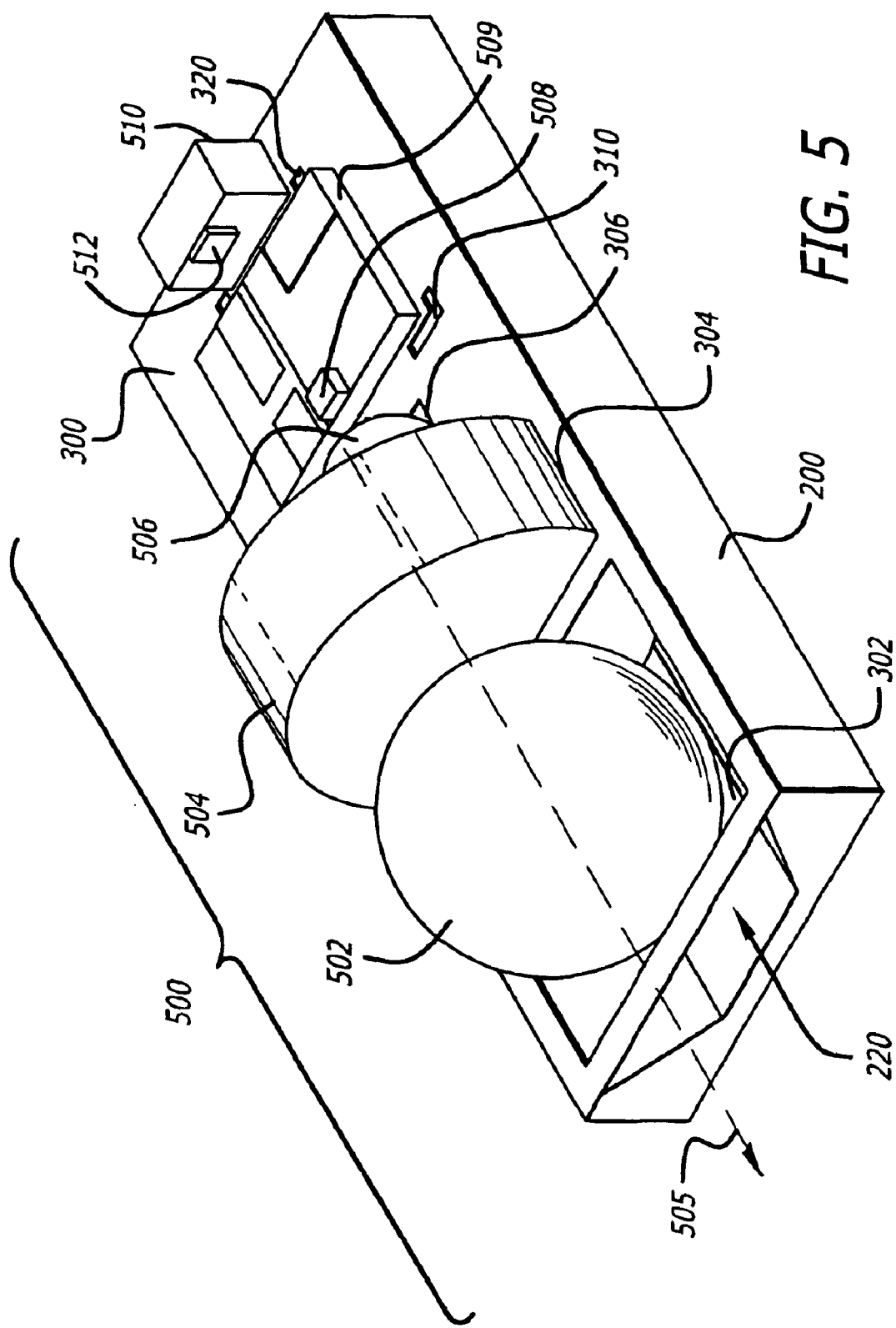
FIG. 5 is a perspective view of components of a transmitter including the optical bench according to one embodiment of the invention.
Figure 6:
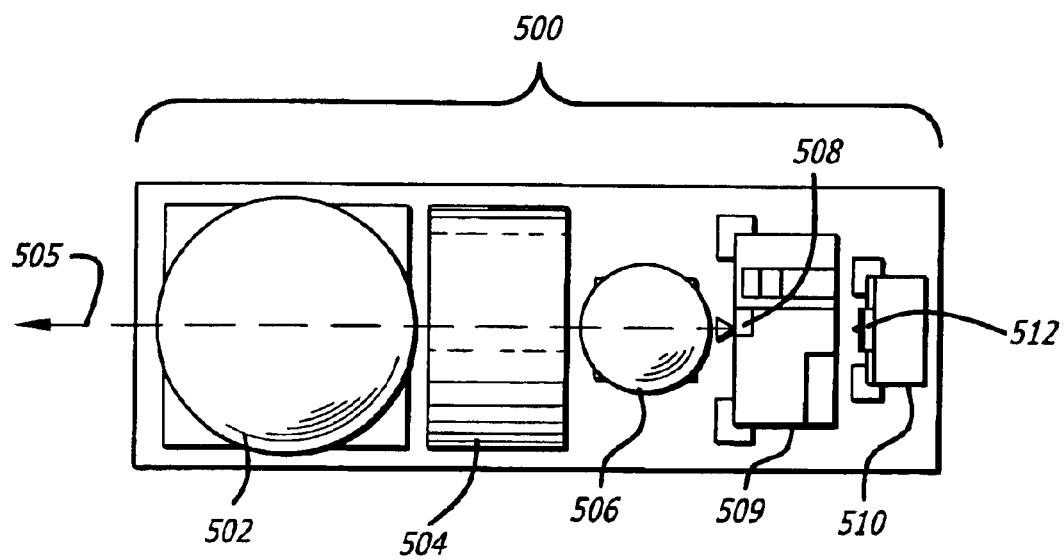
FIG. 6 is a top of view of the transmitter including the optical bench of FIG. 5.

Referring now to FIG. 5, a perspective view of a transmitter mounted with optical bench 500, according to one embodiment of the invention, is shown. Concurrent reference may also be made to FIG. 6, which is a top of view of the transmitter mounted with optical bench 500. As shown in FIGS. 5 and 6, a focusing ball lens 502 is mounted in the opening 302 of the window frame 300. The focusing ball lens 502 focuses collimated light or photons into an optical fiber (not shown). Alternatively, the focusing ball lens 502 may focus light or photons received from an optical fiber (not shown) into a photo diode for an optical receiver.

Adjacent the focusing ball lens 502, an optical isolator 504 is mounted in the opening 304 of the window frame 300. The optical isolator 504 prevents light energy from propagating in an opposite direction to a transmission light path 505 or optical axis. Light may be received from the optical fiber, back reflected by the optical fiber or the lens 502 towards the semiconductor laser 508 and the monitoring photodiode 512. Thus, the optical isolator 504 assures that collimated light follows a one-way path out of the transmitter 500 and any light that may come in the opposite direction from an optical fiber or otherwise is prevented from proceeding past the optical isolator 504 towards the laser source, i.e., the semiconductor laser. That is, the light beam from the semiconductor laser is isolated as an isolated light beam.

A collimating ball lens 506 is mounted in the opening 306 in the window frame 300. The collimating ball lens 506 receives light or photons from a semiconductor laser 508 and focuses the light into a light beam with minimum divergence (e.g. such that all of the light rays are parallel) as a collimated light beam. The collimated light beam is coupled through the optical isolator to the focusing ball lens 502.

It should be appreciated that the bottom portions of the focusing ball lens 502, the optical isolator 504, and the collimating ball lens 506 fit into the slot or groove 220 of the mounting block 200 such that the components of the transmitter fit into the optical bench 400 in a very space efficient manner helping to create a miniaturized transmitter mounted with optical bench 500, according to one embodiment of the invention. Moreover, the focusing ball lens 502, the optical isolator 504, and the collimating ball lens 506 can be secured to their respective openings in the window frame 300 by adhesives, solder paste, press fitting, or other generally known types of securing methods. The optical axis or transmission light path 505 lies above the plane of the window frame 300 in the transmitter mounted with optical bench 500.

The transmitter mounted with optical bench 500 further includes a semiconductor laser chip 508 mounted to a submount 509. The submount 509 mounts to the laser chip openings 310 of the window frame 300. The semiconductor laser chip 508 operates as a light source to generate light or photons in response to an electrical signal or current. The light radiated from the semiconductor laser is then focused by the lenses, such that the light is transmitted along the transmission path or optical axis 505 and into a fiber optic cable. In one embodiment, the semiconductor laser chip 508 is an edge emitting laser having a front end or front edge that emits most of the light output for transmission along the transmission path 505 and a rear end or rear edge that emits a small portion of the light output to couple into a monitoring photodiode 512.

The monitoring photodiode 512 is mounted on a submount 510, which is in turn mounted to the monitoring photodiode openings 320 of the window frame 300. The monitoring photodiode 512 may be used to perform automatic power control of the semiconductor laser chip 508 based on the light output emitted from the rear edge of the semiconductor laser chip 508. For example, the monitoring photodiode 512 may receive the light output emitted from the rear edge of the semiconductor laser chip 508 and generate an output voltage or current in response thereto which is a measure of the power or intensity of the light being emitted from the front edge of the semiconductor laser chip 508. The output voltage or current from the monitoring photodiode 512 may be sampled and used to control a power supply or laser driver circuit (not shown) that supplies current to the semiconductor laser chip 508. The supplied current from the power supply or laser driver circuit activates the semiconductor laser chip 508 to produce optical emission (e.g. light or photons). It should be appreciated that semiconductor lasers in combination with monitoring photodiodes to provide automatic power control are well known in the art.

The submount 509 for the semiconductor laser chip 508 and the submount 510 for the monitoring photodiode 512 may be secured to their respective openings in the window frame 300 by adhesives, solder paste, press fitting, or other generally known types of die attach and securing methods.

In another embodiment, the semiconductor laser chip 508 is a vertical cavity surface emitting laser (VCSEL) having a an emission from a surface. A beam splitter or other optical device may be employed to obtain a fraction of the radiated light output from the VCSEL and couple it into a monitoring photodiode. The monitoring photodiode determines the power in the fraction of the radiated light output in order to obtain a measure of the power in the remaining portion of the radiated light output which is in the light beam down the transmission path or optical axis.

Thus, as previously described, the transmitter mounted with optical bench 500 includes a semiconductor laser chip 508 that operates as a light source to generate light (or photons) that is collimated by a collimating lens 506, passed through an optical isolator 504, and is focused by focusing ball lens 502 into a fiber optic cable. The transmitter mounted with optical bench 500 may further include a monitoring photodiode 512.

Accordingly, as seen in FIGS. 5 and 6, light is transmitted along the transmission path or optical axis 505 of the transmitter 500 and into a fiber optic cable (not shown). Furthermore, the previously described transmitter mounted with optical bench 500 provides a transmitter that fits into an optical bench 400 in a very space efficient manner to create a miniaturized transmitter that is inexpensive to produce. Moreover, the transmitter mounted with optical bench 500 secures the internal components of the transmitter (e.g. the semiconductor laser, associated lenses, and other components) in an accurate and sustainable alignment to create a transmitter that has a very long operational life expectancy.

Figure 7:
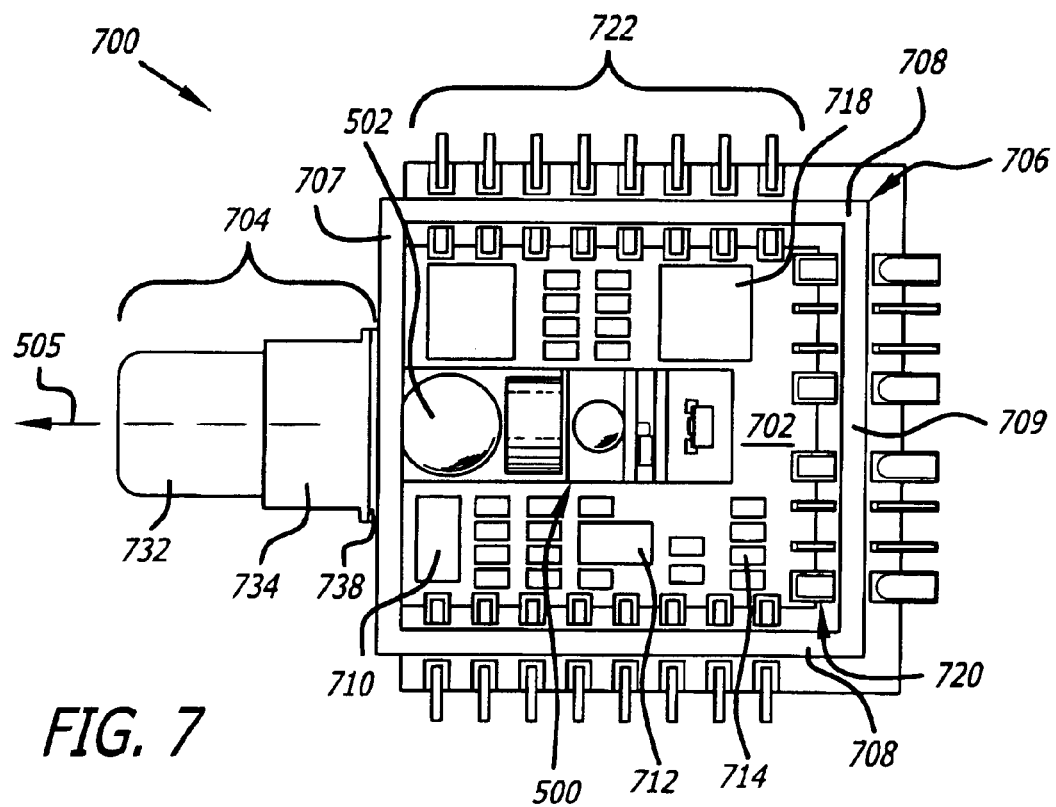
FIG. 7 is a top cut-away view of a packaged optical transmitter including the optical bench assembled with a printed circuit board, an optical port, and a protective case (shown with the top cut-away) according to one embodiment of the invention.

Referring now to FIG. 7, packaging of the transmitter mounted with optical bench 500 is now discussed. FIG. 7 shows a top view of a transmitter optical package 700 that includes the transmitter 500 connected to a printed circuit board 702 and an optical connector plug 704, and a protective case 706 (shown with the top removed), according to one embodiment of the invention. The transmitter optical package 700 may also be referred to as a package optical transmitter. The protective case 706 encloses the transmitter with optical bench 500 and the printed circuit board 702. The printed circuit board 702 includes functionality, such as laser driver circuitry, for utilizing the transmitter with optical bench 500 as part of a larger host system. Particularly, the printed circuit board 702 processes data received from the larger host system into suitable format such that the data can be converted to optical format (e.g. light or photons) and transmitted by the transmitter with optical bench 500 into a fiber optic cable (not shown). In the case of a receiver with optical bench, the printed circuit board includes circuitry to convert the data in the light signals into a data format that can be provided to the host system.

As shown in FIG. 7, the printed circuit board 702 may be populated with standard electronic components such as an inductor 710, an IC chip set 712, capacitors 714, operational amplifiers 718, flux-less solder joints 720 to affix the printed circuit board 702 to a host printed circuit board (not shown), and I/O pins 722 to create input/output links between the printed circuit board 702 and the host printed circuit board.

The protective case 706 (shown with the top removed) may generally be rectangular or square-shaped. The protective case 706 is affixed to a surface and near the edges of the printed circuit board 702 such that it encloses the transmitter mounted with optical bench 500 and the printed circuit board 702. The protective case 706 includes a front wall 707, two parallel sidewalls 708, a backwall 709, an open bottom, and a top wall (not shown). In one embodiment, the protective case 706 can be made from a metallic material or alloy such as KOVAR. Also, the front wall 707 of the protective case 706 includes an opening (not shown) to mate the optical connector plug 704 with the transmitter with optical bench 500.

The optical connector plug 704 allows for the coupling and decoupling of the transmitter with optical bench 500 to a mating plug of a fiber optic cable (not shown). The optical connector plug 704 includes a fiber connector ferrule 732, a sleeve 734, and a window ring 738. Further, a window (not shown) is interposed between the window ring 738 and the front wall 707 of the protective case 706 as will be discussed. In one embodiment, the window is made out of a glass such as sapphire. In a preferred embodiment, the sleeve 734 and the window ring 738 are formed of stainless steel.

Figure 8B:
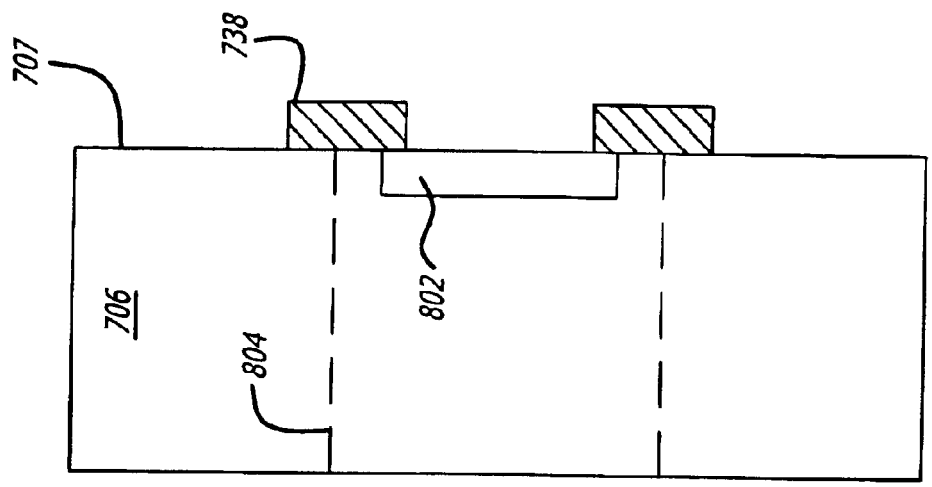
FIG. 8B is a sectional view of FIG. 8A taken along line A—A according to one embodiment of the invention.
Figure 8A:
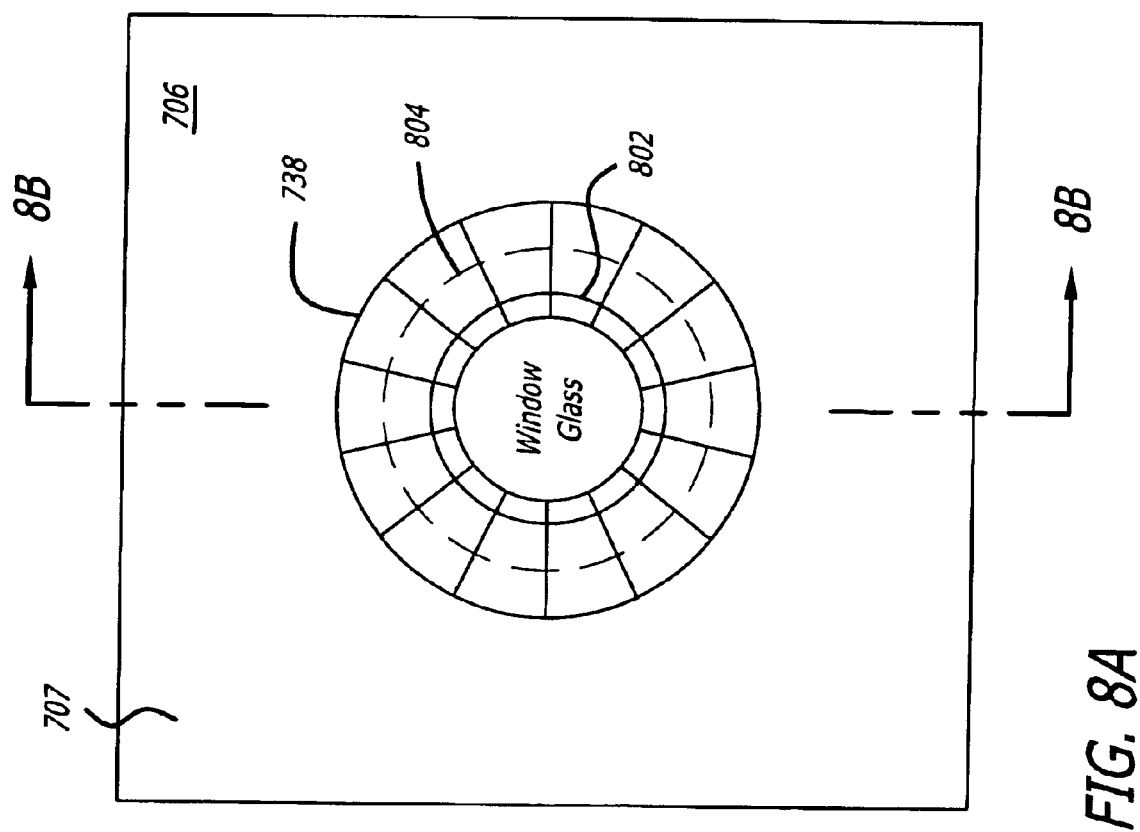
FIG. 8A is a magnified front view of the packaged optical transmitter shown with the optical port removed to particularly illustrate a window attached to a window ring, which is in turn attached to the front face of the protective case, according to one embodiment of the invention.

Referring now to FIG. 8A, a front view of the transmitter optical package 700 with the ferrule 732 and the sleeve 734 of the optical connector plug 704 removed is illustrated. FIG. 8A particularly illustrates a sapphire window 802 attached to the window ring 738 around the opening 804 in the front wall 707 of the protective case 706. Further, reference is also made to FIG. 8B, illustrating a sectional view of FIG. 8A. As shown in FIGS. 8A and 8B, the window 802 is attached to the window ring 738 and fits into an opening 804 of the front wall 707 of the protective case 706. For example, the window 802 can be attached to the window ring 738 by an adhesive or hermetically sealed thereto.

The window ring 738 preferably formed of stainless-steel is brazed onto the front wall 707 of the protective case 706. This creates a hermetic seal between the window ring 738 and the front wall 707 of the protective case 706. The fiber connector ferrule 732 and the sleeve 734 can then be welded (e.g. by laser welding) onto the window ring 738 after active alignment is accomplished. The window ring 738 serves as the coupling link between the fiber connector ferrule 732 and the window 802. Further, the window 802 operates as a lens for the light beam being emitted from the focusing ball lens 502 of the transmitter 500 along the transmission path 505 into a mated fiber optic cable (not shown).

Accordingly, the internal components of the transmitter optical package 700 (e.g. the transmitter 500 and the printed circuit board 702) are substantially isolated by the protective case 706, the window 802, and the hermetic seal formed by the window ring 738 from the outside environment—including the optical connection formed with the mating fiber optic plug and fiber optic cable. This is important because oftentimes the transmitter, receiver or transceiver will have to operate in dirty and/or harsh environments—e.g. where particulates such as dust and liquids (e.g. water) are present. Because the components of the transmitter with optical bench 500 are isolated from the outside environment, the continued cleanliness of components, such as the internal lenses for the focusing of light signals, can be ensured. In this way, the transmitter 500 can be expected to operate reliably for a long period of time.

Figure 9:
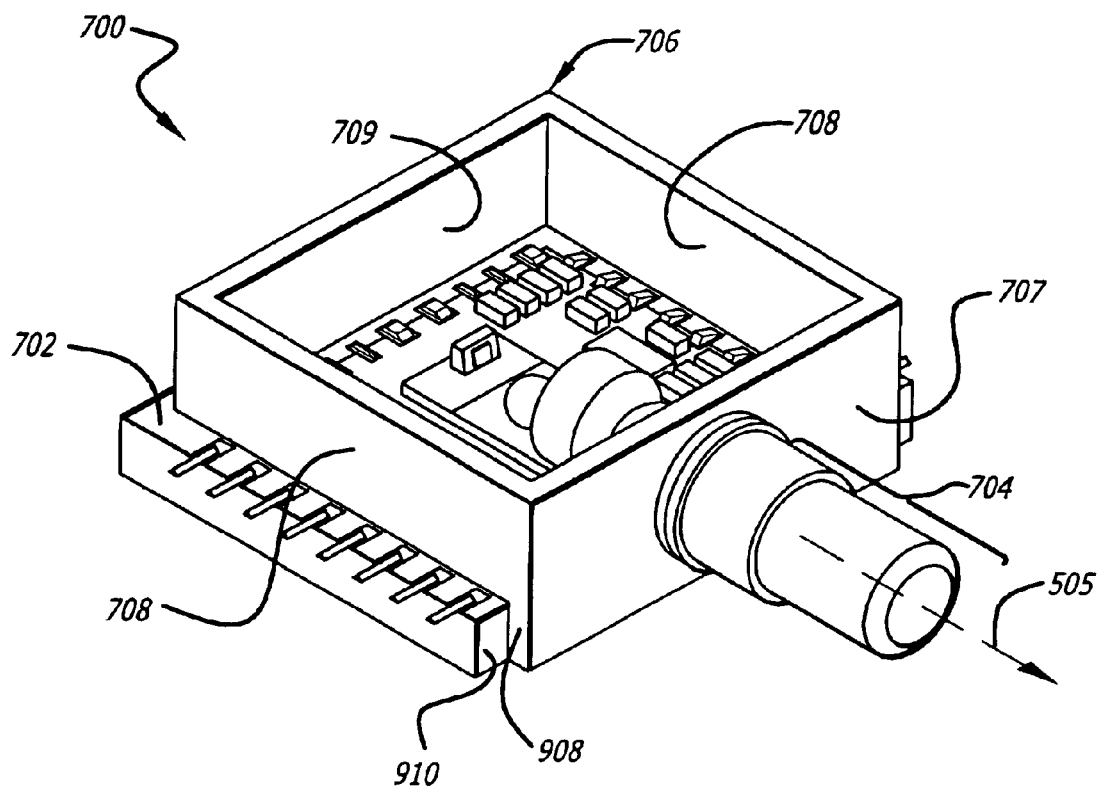
FIG. 9 is a perspective view of the packaged optical transmitter of FIG. 7 (shown with the top removed or cut away) according to one embodiment of invention.

Referring now to FIG. 9, a perspective view of the transmitter optical package 700 according to one embodiment of the invention is illustrated. Particularly, FIG. 9 shows the protective case 706 mounted to the printed circuit board 702 near the edges of the printed circuit board 702. Also, as can be seen in FIG. 9, the front wall 707 of the protective case 706 extends further downwards than the other walls of the protective case (i.e. the sidewalls 708 and the backwall 709) and thus has an extended portion 908 that mates with the front wall 910 of the printed circuit board 702. As should be appreciated, KOVAR is a type of metallic alloy and the portions of the printed circuit board 702 which mate with the KOVAR near the edges of the printed circuit board 702 are ceramic to avoid shorting thereto.

The protective case 706, being a metal or alloy such as KOVAR, can be preferably secured to the printed circuit board 702 by the use of a solder alloy. The solder alloy can be used to secure the protective case 706 formed of KOVAR to the printed circuit board 702 near the edges of the printed circuit board 702 and along the extended portion 908 of the front wall 707 of the protection case 706 to the front wall 910 of the printed circuit board 702. In one particular embodiment, an 80/20 mixture of a gold/tin (Au/Sn) solder alloy can be utilized to secure the protective case 706 formed of KOVAR to the printed circuit board 702.

Figure 10:
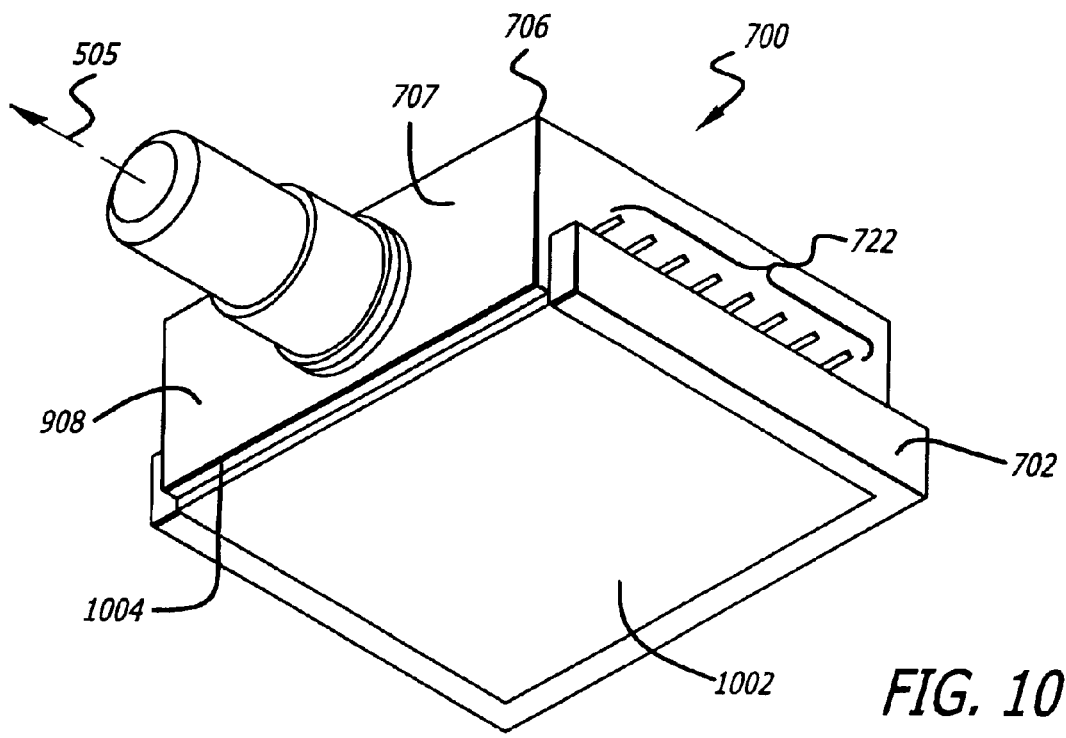
FIG. 10 is a bottom perspective view of the packaged optical transmitter of FIG. 7 according to one embodiment of invention.

Referring now to FIG. 10, FIG. 10 shows a bottom perspective view of the transmitter optical package 700 according to one embodiment of the invention. FIG. 10 shows the bottom 1002 of the printed circuit board 702 and also shows the bottom edge 1004 of the extended portion 908 of the front wall 707 of the protective case 706. In one, embodiment, the bottom edge 1004 of the extended portion 908 of the front wall 707 can be grounded to a copper tungsten heat sinker (not shown). Also, the I/O pins 722 of the printed circuit board 702 extend outward from the printed circuit board 702 such that they can be easily mated to a socket of another printed circuit board of a host system as will be discussed. In another embodiment, the printed circuit board may include a connector or an edge connection to slidingly plug into and out of a connector of a host system.

Figure 11A:
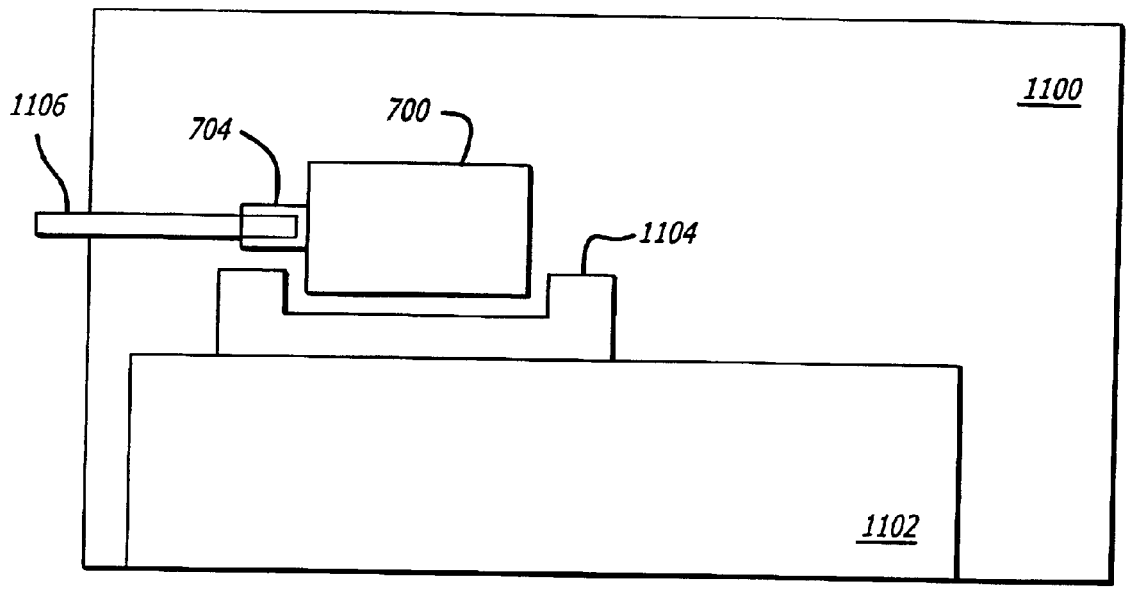
FIG. 11A is a side view of an exemplary host system in which the packaged optical transmitter can be mounted and utilized according to one embodiment of the invention.

Referring now to FIG. 11A, a side view of an exemplary host system 1100 in which the transmitter optical package 700 can be mounted and utilized according to one embodiment of the invention. Examples of a host system 1100 that could utilize a transmitter optical package 700 include any type of networking device such as a switch, router, gateway device, Private Branch Exchange (PBX), multi-service access device, wireless base station, etc., or generally any type of computing device such as a server, desktop computer, mainframe, etc. However, it should be appreciated that the previous listed examples are only illustrative, and that any sort of computing device can act as a host system 1100 and utilize the transmitter optical package 700.

As shown in FIG. 11A, the host system 1100 may include a host system printed circuit board 1102, which may further include a socket 1104 that can mate with the transmitter optical package 700. The exemplary host system 1100 also includes a fiber optic cable 1106 that mates with the transmitter optical package 700.

Figure 11B:
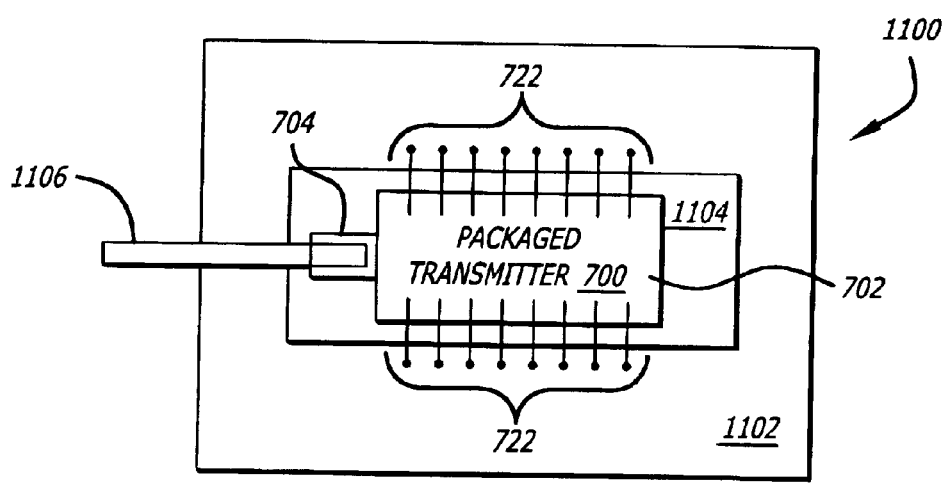
FIG. 11B is a top view of FIG. 11A showing the packaged optical transmitter mounted in the exemplary host system.

Referring now to FIG. 11B, a top view of FIG. 11A showing a transmitter optical package 700 mounted in the exemplary host system 1100 is illustrated. As shown in FIG. 11B, the transmitter optical package 700 is mated (e.g. inserted in) the socket 1104 of the host system printed circuit board 1102. Further, the I/O pins 722 of the transmitter optical package 700 are mated with corresponding pins, leads, or traces etc. of the host system printed circuit board 1102. For example, the I/O pins 722 may be soldered or otherwise connected to the corresponding pins, leads, or traces etc. of the host system printed circuit board 1102. Alternatively, the host system printed circuit board 1102 may provide a receptacle (not shown) to operate in conjunction with the socket 1102 having female connectors designed to specifically mate with the I/O pins 722 of the transmitter optical package 700. Further, the optical plug 704 of the transmitter optical package 700 may be connected to an optical connector of the fiber optic cable 1106 so that the transmitter 500 of the transmitter optical package 700 can transmit light or photons into the fiber optical cable 1106, as previously discussed.

Accordingly, in this example environment, the transmitter mounted with optical bench 500 of the transmitter optical package 700 may receive data from the host system printed board 1102 of the host system 1100 via I/O pins 722 and convert this data into light or photons, as previously discussed, and then transmit this light or photonic data into the fiber optic cable 1106 for transmission through a network to a receiver at the other end of the fiber optic cable 1106. It should be appreciated that this is only an example environment and that the transmitter optical package 700, the transmitter mounted with optical bench 500, and the other aspects of the invention, can be utilized in a wide variety of different environments.

It should be understood that in describing aspects of the invention terms such as "top", "bottom", "front", "back", "rear" etc. are used by way of example only, due to the orientation of the drawings.

In yet another embodiment, the semiconductor laser chip 508 is replaced with a receiving photodiode to receive a light signal to form a receiver mounted with optical bench. Including the printed circuit board and the protective casing with the receiver mounted with optical bench, a package optical receiver is formed. In yet another embodiment, the mounting block 200 and window frame 300 may be expanded to include multiple windows and multiple slots or grooves along respective multiple optical axes of an optical bench. Thus, more than one channel of communication or a transceiver mounted with optical bench may be formed.

While certain exemplary embodiments have been described and shown in the accompanying drawings, it is to be understood that such embodiments are merely illustrative of and not restrictive of the broad invention, and that this invention is not to be limited to the specific constructions and arrangements shown and described, since various other modifications may occur to those skilled in the art.

What is claimed is:

1. An optical transmitter to transmit light signals over an optical fiber, the optical transmitter comprising:

an optical bench including
   a mounting block having a groove, and
   a window frame having a plurality of openings for mounting transmitter components including a ball lens opening to mount a ball lens and a laser chip opening to mount a semiconductor laser chip, the window frame to couple to the mounting block;
a semiconductor laser chip mounted to the laser chip opening of the window frame, the semiconductor laser chip to generate light signals for optical communication; and
a ball lens mounted in the ball lens opening and extending into the groove, the ball lens to focus the light signals.

2. The optical transmitter of claim 1, wherein the groove is V-shaped.

3. The optical transmitter of claim 1, wherein
the window frame is coupled to the mounting block using solder paste.

4. The optical transmitter of claim 1, wherein
the ball lens opening is a focusing ball lens opening and
the ball lens is a focusing ball lens to focus light signals into a fiber optic cable.

5. The optical transmitter of claim 4, wherein
the window frame further includes
a collimating ball lens opening in the window frame,
and the optical transmitter further includes
a collimating ball lens mounted in the collimating ball lens opening and extending into the groove, the collimating ball lens to collimate light signals from the semiconductor laser chip.

6. The optical transmitter of claim 5, wherein
the optical bench further includes
an optical isolator opening in the window frame
and the optical transmitter further includes
an optical isolator mounted in the optical isolator opening and extending into the groove.

7. The optical transmitter of claim 1, wherein
the optical bench further includes
at least one submount opening in the window frame,
and the optical transmitter further includes
a submount mounted in the at least one submount opening, and
a monitoring photodiode coupled to the submount, the monitoring photodiode to monitor a monitoring light output from the semiconductor laser chip to provide automatic power control of the light signals.

8. The optical transmitter of claim 1, wherein
the mounting block is aluminum and plated with gold.

9. The optical transmitter of claim 1, wherein
the window frame is stainless-steel and plated with gold.

10. A method of manufacturing an optical transmitter including an optical bench, the method comprising:
forming a groove into a mounting block;
forming a plurality of openings for mounting transmitter components including a ball lens opening to mount a ball lens and a laser chip opening to mount a laser chip in a window frame;
coupling the window frame to the mounting block to form the optical bench;
mounting a laser chip to the laser chip opening of the window frame, the laser chip to generate light signals for optical communication; and
mounting a ball lens in the ball lens opening, the ball lens extending into the groove of the mounting block, the ball lens to focus the light signals.

11. The method of manufacturing of claim 10, wherein
the groove is V-shaped.

12. The method of manufacturing of claim 10, wherein
the window frame is coupled to the mounting block using solder paste.

13. The method of manufacturing of claim 10, wherein
the ball lens opening is a focusing ball lens opening and
the ball lens is a focusing ball lens to focus light signals into a fiber optic cable.

14. The method of manufacturing of claim 13, further comprising:
forming a collimating ball lens opening in the window frame; and
mounting a collimating ball lens in the collimating ball lens opening, the collimating ball lens extending into the groove, the collimating ball lens to collimate light signals from the laser chip.

15. The method of manufacturing of claim 14, further comprising:
forming an optical isolator opening in the window frame; and
mounting an optical isolator in the optical isolator opening, the optical isolator extending into the groove.

16. The method of manufacturing of claim 10, further comprising:
forming submount openings in the window frame; and
mounting a submount into the submount openings; and
mounting a monitoring photodiode to the submount, the monitoring photodiode to monitor a light output from the laser chip to provide automatic power control.

17. The method of manufacturing of claim 10, further comprising:
forming the mounting block from aluminum; and
plating the aluminum mounting block with gold.

18. The method of manufacturing of claim 10, further comprising:
forming the window frame from stainless-steel; and
plating the window frame with gold.

19. A light transmitter to transmit light signals over an optical fiber, the light transmitter comprising:
a hybrid optical bench including
a mounting block having a groove, and
a window frame to couple to the mounting block, the window frame having a plurality of openings to mount a plurality of components therein;
a semiconductor laser coupled to the hybrid optical bench, the semiconductor laser to generate a transmit light signal;
a first lens mounted in a first opening of the plurality of openings in the window frame and extending into the groove of the mounting block, the first lens to collimate the transmit light signal;
an optical isolator mounted in a second opening of the plurality of openings in the window frame and extending into the groove of the mounting block, the optical isolator to deter reflection of the transmit light signal back towards the first lens and the semiconductor laser; and,
a second lens mounted in a third opening of the plurality of openings in the window frame and extending into the groove of the mounting block, the second lens to focus the transmit light signal into the optical fiber.

20. The light transmitter of claim 19, wherein
the groove is V-shaped.

21. The light transmitter of claim 19, wherein
the groove is U-shaped.

22. The light transmitter of claim 19, wherein
the window frame is coupled to the mounting block by solder.

23. The light transmitter of claim 19, wherein
the semiconductor laser is coupled to the hybrid optical bench in a fourth opening of the plurality of openings in the window frame.

24. The light transmitter of claim 19, further comprising:
a printed circuit board to couple to the hybrid optical bench;
a protective case to protect and cover the hybrid optical bench and a portion of the printed circuit board; and
an optical plug coupled to a wall of the protective case and aligned with the hybrid optical bench to couple the transmit light signal into the optical fiber.

25. The light transmitter of claim 24, wherein
the protective case is coupled to a surface of the printed circuit board near edges thereof.

26. The light transmitter of claim 24, wherein
the optical plug includes
   a window ring having a window aligned with the hybrid optical bench to couple the transmit light signal into the optical fiber, the window ring coupled to the wall of the protective case around an opening therein,
   a fiber connector ferrule coupled to the window ring, and
   a sleeve coupled to the window ring over the fiber connector ferrule.

27. The light transmitter of claim 24, wherein
the printed circuit board includes pins to couple to a host system.

28. The light transmitter of claim 24, wherein
the printed circuit board includes a first connector to plug into a second connector of a host system.

29. The light transmitter of claim 24, wherein
the semiconductor laser is an edge emitting semiconductor laser and generates the transmit light signal from a front edge and the monitor light signal from a back edge.

30. The light transmitter of claim 24, wherein
the semiconductor laser is a vertical cavity surface emitting semiconductor laser and generates the transmit light signal from a surface and the monitor light signal is a portion of the transmit light signal coupled into the photodiode.

31. The light transmitter of claim 19, wherein
the semiconductor laser to generate a monitor light signal, and
the light transmitter further includes
   a photodiode coupled to the hybrid optical bench to receive the monitor light signal and generate an electrical signal to provide automatic power control.

32. The light transmitter of claim 19, wherein
the mounting block is an aluminum block plated with gold.

33. The light transmitter of claim 19, wherein
the window frame is a stainless-steel frame plated with gold.

34. A fiber optic transmitter to transmit light signals over an optical fiber, the fiber optic transmitter comprising:
an optical bench including
   a metallic mounting block having a groove, and
   a metallic window frame coupled to the metallic mounting block, the metallic window frame having openings in line with the groove in the metallic mounting block to allow optical components to mount to the optical bench;
a semiconductor laser coupled to the optical bench, the semiconductor laser to generate a radiated light signal;
a first ball lens mounted to the optical bench in a first opening in the metallic window frame and extending into the groove of the metallic mounting block, the first ball lens to collimate the radiated light signal into a collimated light signal;
an optical isolator mounted to the optical bench in a second opening of the metallic window frame and extending into the groove of the metallic mounting block, the optical isolator to receive the collimated light signal and generate an isolated light signal; and
a second ball lens mounted in a third opening of the metallic window frame and extending into the groove of the metallic mounting block, the second ball lens to focus the isolated light signal into a focused light signal for coupling into the optical fiber.

35. The fiber optic transmitter of claim 34, wherein
the optical isolator to isolate the first ball lens and the semiconductor laser from reflections of the isolated light signal off of the second ball lens.

36. The fiber optic transmitter of claim 34, wherein
the groove is V-shaped.

37. The fiber optic transmitter of claim 34, wherein
the groove is U-shaped.

38. The fiber optic transmitter of claim 34, further comprising:
a printed circuit board to couple to the optical bench;
a protective case to protect and cover the optical bench and a portion of the printed circuit board, the protective case having an opening in a wall aligned with the groove in the optical axis of the optical bench; and
an optical plug coupled around the opening in the wall of the protective case to couple the focused light signal into the optical fiber.

39. The fiber optic transmitter of claim 38, wherein
the optical plug includes
   a window ring having a window aligned with the optical axis of the optical bench, the window ring coupled to the wall of the protective case around the opening therein,
   a fiber connector ferrule coupled to the window ring, and
   a sleeve coupled to the window ring over the fiber connector ferrule.

40. The fiber optic transmitter of claim 38, wherein
the printed circuit board includes pins to couple to a host system.

41. The fiber optic transmitter of claim 38, wherein
the printed circuit board includes a first connector to plug into a second connector of a host system.

42. The fiber optic transmitter of claim 34, wherein
a monitor light signal is formed responsive to the radiated light signal of the semiconductor laser, and
the fiber optic transmitter further includes
   a photodiode coupled to the optical bench to receive the monitor light signal and generate an electrical signal in response thereto for automatic power control.

* * * * *